United States Patent Office 3,654,220
Patented Apr. 4, 1972

3,654,220
STABILIZED POLYOLEFIN COMPOSITIONS
Henryk A. Cyba, Evanston, Ill., assignor to Universal Oil Products Company, Des Plaines, Ill.
No Drawing. Continuation-in-part of application Ser. No. 750,483, Aug. 6, 1968. This application May 1, 1970, Ser. No. 33,992
Int. Cl. C08f 45/60
U.S. Cl. 260—45.9 R
8 Claims

ABSTRACT OF THE DISCLOSURE

Polymeric composition containing an N,N-di-(hydrocarbyloxyalkyl)-hydrocarbylamine. In one embodiment the compound serves as a curing catalyst for curable polymeric compositions. In another embodiment the compound serves as a stabilizer to retard deterioration due to oxidation, UV absorption or thermal effects.

CROSS REFERENCE TO RELATED APPLICATIONS

This is a continuation-in-part of application Ser. No. 750,483, filed Aug. 6, 1968, now abandoned.

DESCRIPTION OF THE INVENTION

This invention relates to the use of N,N-di-(hydrocarbyloxyalkyl)-hydrocarbyl amines in polymeric compositions. As hereinbefore set forth, in one embodiment, the compound serves as a curing catalyst. In another embodiment the compound serves as a stabilizer to retard deterioration of the plastic due to oxidation, ultraviolet light absorption, thermal effects, etc. When used as a curing catalyst, the compound also may serve as a stabilizer because it is retained in the polymeric composition.

The N,N-di-(hydrocarbyloxyalkyl)-hydrocarbyl amines for use in the present invention are of the following structure:

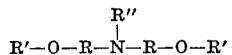

where R is alkylene of from 2 to about 10 carbon atoms, R' is selected from alkyl of from 1 to about 20 carbon atoms and cycloalkyl of from 3 to about 12 carbon atoms and R'' is selected from sec-alkyl of from 3 to about 20 carbon atoms and cycloalkyl as above defined.

Illustrative compounds in which R contains 2 carbon atoms and R'' is secondary alkyl include N,N-di-(methoxyethyl)-isopropylamine,
N,N-di-(ethoxyethyl)-isopropylamine,
N,N-di-(propoxyethyl)-isopropylamine,
N,N-di-(butoxyethyl)-isopropylamine,
N,N-di-(pentoxyethyl)-isopropylamine,
N,N-di-(hexoxyethyl)-isopropylamine,
N,N-di-(heptoxyethyl)-isopropylamine,
N,N-di-(octoxyethyl)-isopropylamine,
N,N-di-(nonoxyethyl)-isopropylamine,
N,N-di-(decoxyethyl)-isopropylamine,
N,N-di-(undecoxyethyl)-isopropylamine,
N,N-di-(dodecoxyethyl)-isopropylamine,
N,N-di-(methoxyethyl)-sec-butylamine,
N,N-di-(ethoxyethyl)-sec-butylamine,
N,N-di-(propoxyethyl)-sec-butylamine,
N,N-di-(butoxyethyl)-sec-butylamine,
N,N-di-(pentoxyethyl)-sec-butylamine,
N,N-di-(hexoxyethyl)-sec-butylamine,
N,N-di-(heptoxyethyl)-sec-butylamine,
N,N-di-(octoxyethyl)-sec-butylamine,
N,N-di-(nonoxyethyl)-sec-butylamine,
N,N-di-(decoxyethyl)-sec-butylamine,
N,N-di-(undecoxyethyl)-sec-butylamine,
N,N-di-(dodecoxyethyl)-sec-butylamine,
N,N-di-(methoxyethyl)-sec-pentylamine,
N,N-di-(ethoxyethyl)-sec-pentylamine,
N,N-di-(propoxyethyl)-sec-pentylamine,
N,N-di-(butoxyethyl)-sec-pentylamine,
N,N-di-(pentoxyethyl)-sec-pentylamine,
N,N-di-(hexoxyethyl)-sec-pentylamine,
N,N-di-(heptoxyethyl)-sec-pentylamine,
N,N-di-(octoxyethyl)-sec-pentylamine,
N,N-di-(nonoxyethyl)-sec-pentylamine,
N,N-di-(decoxyethyl)-sec-pentylamine,
N,N-di-(undecoxyethyl)-sec-pentylamine,
N,N-di-(dodecoxyethyl)-sec-pentylamine,
N,N-di-(methoxyethyl)-sec-hexylamine,
N,N-di-(ethoxyethyl)-sec-hexylamine,
N,N-di-(propoxyethyl)-sec-hexylamine,
N,N-di-(butoxyethyl)-sec-hexylamine,
N,N-di-(pentoxyethyl)-sec-hexylamine,
N,N-di-(hexoxyethyl)-sec-hexylamine,
N,N-di-(heptoxyethyl)-sec-hexylamine,
N,N-di-(octoxyethyl)-sec-hexylamine,
N,N-di-(nonoxyethyl)-sec-hexylamine,
N,N-di-(decoxyethyl)-sec-hexylamine,
N,N-di-(undecoxyethyl)-sec-hexylamine,
N,N-di-(dodecoxyethyl)-sec-hexylamine,
N,N-di-(methoxyethyl)-sec-heptylamine,
N,N-di-(ethoxyethyl)-sec-heptylamine,
N,N-di-(propoxyethyl)-sec-heptylamine,
N,N-di-(butoxyethyl)-sec-heptylamine,
N,N-di-(pentoxyethyl)-sec-heptylamine,
N,N-di-(hexoxyethyl)-sec-heptylamine,
N,N-di-(heptoxyethyl)-sec-heptylamine,
N,N-di-(octoxyethyl)-sec-heptylamine,
N,N-di-(nonoxyethyl)-sec-heptylamine,
N,N-di-(decoxyethyl)-sec-heptylamine,
N,N-di-(undecoxyethyl)-sec-heptylamine,
N,N-di-(dodecoxyethyl)-sec-heptylamine,
N,N-di-(methoxyethyl)-sec-nonylamine,
N,N-di-(ethoxyethyl)-sec-nonylamine,
N,N-di-(propoxyethyl)-sec-nonylamine,
N,N-di-(butoxyethyl)-sec-nonylamine,
N,N-di-(pentoxyethyl)-sec-nonylamine,
N,N-di-(hexoxyethyl)-sec-nonylamine,
N,N-di-(heptoxyethyl)-sec-nonylamine,
N,N-di-(octoxyethyl)-sec-nonylamine,
N,N-di-(nonoxyethyl)-sec-nonylamine,
N,N-di-(decoxyethyl)-sec-nonylamine,
N,N-di-(undecoxyethyl)-sec-nonylamine,
N,N-di-(dodecoxyethyl)-sec-nonylamine,
N,N-di-(methoxyethyl)-sec-decylamine,
N,N-di-(ethoxyethyl)-sec-decylamine,
N,N-di-(propoxyethyl)-sec-decylamine,
N,N-di-(butoxyethyl)-sec-decylamine,
N,N-di-(pentoxyethyl)-sec-decylamine,
N,N-di-(hexoxyethyl)-sec-decylamine,
N,N-di-(heptoxyethyl)-sec-decylamine,
N,N-di-(octoxyethyl)-sec-decylamine,
N,N-di-(nonoxyethyl)-sec-decylamine,
N,N-di-(decoxyethyl)-sec-decylamine,
N,N-di-(undecoxyethyl)-sec-decylamine,
N,N-di-(dodecoxyethyl)-sec-decylamine,
N,N-di-(methoxyethyl)-sec-undecylamine,
N,N-di-(ethoxyethyl)-sec-undecylamine,
N,N-di-(propoxyethyl)-sec-undecylamine,
N,N-di-(butoxyethyl)-sec-undecylamine,
N,N-di-(pentoxyethyl)-sec-undecylamine,
N,N-di-(hexoxyethyl)-sec-undecylamine,
N,N-di-(heptoxyethyl)-sec-undecylamine,
N,N-di-(octoxyethyl)-sec-undecylamine,
N,N-di-(nonoxyethyl)-sec-undecylamine,
N,N-di-(decoxyethyl)-sec-undecylamine,
N,N-di-(undecoxyethyl)-sec-undecylamine, N,N-di-(dodecoxyethyl)-sec-undecylamine,
N,N-di-(methoxyethyl)-sec-dodecylamine,
N,N-di-(ethoxyethyl)-sec-dodecylamine,
N,N-di-(propoxyethyl)-sec-dodecylamine,
N,N-di-(butoxyethyl)-sec-dodecylamine,
N,N-di-(pentoxyethyl)-sec-dodecylamine,
N,N-di-(hexoxyethyl)-sec-dodecylamine,
N,N-di-(heptoxyethyl)-sec-dodecylamine,
N,N-di-(octoxyethyl)-sec-dodecylamine,
N,N-di-(nonoxyethyl)-sec-dodecylamine,
N,N-di-(decoxyethyl)-sec-dodecylamine,
N,N-di-(undecoxyethyl)-sec-dodecylamine,
N,N-di-(dodecoxyethyl)-sec-dodecylamine,
N,N-di-(methoxyethyl)-sec-tridecylamine,
N,N-di-(ethoxyethyl)-sec-tridecylamine,
N,N-di-(propoxyethyl)-sec-tridecylamine,
N,N-di-(butoxyethyl)-sec-tridecylamine,
N,N-di-(pentoxyethyl)-sec-tridecylamine,
N,N-di-(hexoxyethyl)-sec-tridecylamine,
N,N-di-(heptoxyethyl)-sec-tridecylamine,
N,N-di-(octoxyethyl)-sec-tridecylamine,
N,N-di-(nonoxyethyl)-sec-tridecylamine,
N,N-di-(decoxyethyl)-sec-tridecylamine,
N,N-di-(undecoxyethyl)-sec-tridecylamine,
N,N-di-(dodecoxyethyl)-sec-tridecylamine,
N,N-di-(methoxyethyl)-sec-tetradecylamine,
N,N-di-(ethoxyethyl)-sec-tetradecylamine,
N,N-di-(propoxyethyl)-sec-tetradecylamine,
N,N-di-(butoxyethyl)-sec-tetradecylamine,
N,N-di-(pentoxyethyl)-sec-tetradecylamine,
N,N-di-(hexoxyethyl)-sec-tetradecylamine,
N,N-di-(heptoxyethyl)-sec-tetradecylamine,
N,N-di-(octoxyethyl)-sec-tetradecylamine,
N,N-di-(nonoxyethyl)-sec-tetradecylamine,
N,N-di-(decoxyethyl)-sec-tetradecylamine,
N,N-di-(undecoxyethyl)-sec-tetradecylamine,
N,N-di-(dodecoxyethyl)-sec-tetradecylamine,
N,N-di(methoxyethyl)-sec-pentadecylamine,
N,N-di-(ethoxyethyl)-sec-pentadecylamine,
N,N-di-(propoxyethyl)-sec-pentadecylamine,
N,N-di-(butoxyethyl)-sec-pentadecylamine,
N,N-di-(pentoxyethyl)-sec-pentadecylamine,
N,N-di-(hexoxyethyl)-sec-pentadecylamine,
N,N-di-(heptoxyethyl)-sec-pentadecylamine,
N,N-di-(octoxyethyl)-sec-pentadecylamine,
N,N-di-(nonoxyethyl)-sec-pentadecylamine,
N,N-di-(decoxyethyl)-sec-pentadecylamine,
N,N-di-(undecoxyethyl)-sec-pentadecylamine,
N,N-di-(dodecoxyethyl)-sec-pentadecylamine,
N,N-di-(methoxyethyl)-sec-hexadecylamine,
N,N-di-(ethoxyethyl)-sec-hexadecylamine,
N,N-di-(propoxyethyl)-sec-hexadecylamine,
N,N-di-(butoxyethyl)-sec-hexadecylamine,
N,N-di-(pentoxyethyl)-sec-hexadecylamine,
N,N-di-(hexoxyethyl)-sec-hexadecylamine,
N,N-di-(heptoxyethyl)-sec-hexadecylamine,
N,N-di-(octoxyethyl)-sec-hexadecylamine,
N,N-di-(nonoxyethyl)-sec-hexadecylamine,
N,N-di-(decoxyethyl)-sec-hexadecylamine,
N,N-di-(undecoxyethyl)-sec-hexadecylamine,
N,N-di-(dodecoxyethyl)-sec-hexadecylamine,
N,N-di-(methoxyethyl)-sec-heptadecylamine,
N,N-di-(ethoxyethyl)-sec-heptadecylamine,
N,N-di-(propoxyethyl)-sec-heptadecylamine,
N,N-di-(butoxyethyl)-sec-heptadecylamine,
N,N-di-(pentoxyethyl)-sec-heptadecylamine,
N,N-di-(hexoxyethyl)-sec-heptadecylamine,
N,N-di-(heptoxyethyl)-sec-heptadecylamine,
N,N-di-(octoxyethyl)-sec-heptadecylamine,
N,N-di-(nonoxyethyl)-sec-heptadecylamine,
N,N-di-(decoxyethyl)-sec-heptadecylamine,
N,N-di-(undecoxyethyl)-sec-heptadecylamine,
N,N-di-(dodecoxyethyl)-sec-heptadecylamine,
N,N-di-(methoxyethyl)-sec-octadecylamine,
N,N-di-(ethoxyethyl)-sec-octadecylamine,
N,N-di-(propoxyethyl)-sec-octadecylamine,
N,N-di-(butoxyethyl)-sec-octadecylamine,
N,N-di-(pentoxyethyl)-sec-octadecylamine,
N,N-di-(hexoxyethyl)-sec-octadecylamine,
N,N-di-(heptoxyethyl)-sec-octadecylamine,
N,N-di-(octoxyethyl)-sec-octadecylamine,
N,N-di-(nonoxyethyl)-sec-octadecylamine,
N,N-di-(decoxyethyl)-sec-octadecylamine,
N,N-di-(undecoxyethyl)-sec-octadecylamine,
N,N-di-(dodecoxyethyl)-sec-octadecylamine,
N,N-di-(methoxyethyl)-sec-nonadecylamine,
N,N-di-(ethoxyethyl)-sec-nonadecylamine,
N,N-di-(propoxyethyl)-sec-nonadecylamine,
N,N-di-(butoxyethyl)-sec-nonadecylamine,
N,N-di-(pentoxyethyl)-sec-nonadecylamine,
N,N-di-(hexoxyethyl)-sec-nonadecylamine,
N,N-di-(heptoxyethyl)-sec-nonadecylamine,
N,N-di-(octoxyethyl)-sec-nonadecylamine,
N,N-di-(nonoxyethyl)-sec-nonadecylamine,
N,N-di-(decoxyethyl)-sec-nonadecylamine,
N,N-di-(undecoxyethyl)-sec-nonadecylamine,
N,N-di-(dodecoxyethyl)-sec-nonadecylamine,
N,N-di-(methoxyethyl)-sec-eicosylamine,
N,N-di-(ethoxyethyl)-sec-eicosylamine,
N,N-di-(propoxyethyl)-sec-eicosylamine,
N,N-di-(butoxyethyl)-sec-eicosylamine,
N,N-di-(pentoxyethyl)-sec-eicosylamine,
N,N-di-(hexoxyethyl)-sec-eicosylamine,
N,N-di-(heptoxyethyl)-sec-eicosylamine,
N,N-di-(octoxyethyl)-sec-eicosylamine,
N,N-di-(nonoxyethyl)-sec-eicosylamine,
N,N-di-(decoxyethyl)-sec-eicosylamine,
N,N-di-(undecoxyethyl)-sec-eicosylamine,
N,N-di-(dodecoxyethyl)-sec-eicosylamine, etc.

Corresponding illustrative compounds in which R'' is cycloalkyl include

N,N-di-(methoxyethyl)-cyclopropylamine,
N,N-di-(ethoxyethyl)-cyclopropylamine,
N,N-di-(propoxyethyl)-cyclopropylamine,
N,N-di-(butoxyethyl)-cyclopropylamine,
N,N-di-(pentoxyethyl)-cyclopropylamine,
N,N-di-(hexoxyethyl)-cyclopropylamine,
N,N-di-(heptoxyethyl)-cyclopropylamine,
N,N-di-(octoxyethyl)-cyclopropylamine,
N,N-di-(nonoxyethyl)-cyclopropylamine,
N,N-di-(decoxyethyl)-cyclopropylamine,
N,N-di-(undecoxyethyl)-cyclopropylamine,
N,N-di-(dodecoxyethyl)-cyclopropylamine,
N,N-di-(methoxyethyl)-cyclobutylamine,
N,N-di-(ethoxyethyl)-cyclobutylamine,
N,N-di-(propoxyethyl)-cyclobutylamine,
N,N-di-(butoxyethyl)-cyclobutylamine,
N,N-di-(pentoxyethyl)-cyclobutylamine,
N,N-di-(hexoxyethyl)-cyclobutylamine,
N,N-di-(heptoxyethyl)-cyclobutylamine,
N,N-di-(octoxyethyl)-cyclobutylamine,
N,N-di-(nonoxyethyl)-cyclobutylamine,
N,N-di-(decoxyethyl)-cyclobutylamine,
N,N-di-(undecoxyethyl)-cyclobutylamine,
N,N-di-(dodecoxyethyl)-cyclobutylamine,
N,N-di-(methoxyethyl)-cyclopentylamine,
N,N-di-(ethoxyethyl)-cyclopentylamine,
N,N-di-(propoxyethyl)-cyclopentylamine,
N,N-di-(butoxyethyl)-cyclopentylamine,
N,N-di-(pentoxyethyl)-cyclopentylamine,
N,N-di-(hexoxyethyl)-cyclopentylamine,
N,N-di-(heptoxyethyl)-cyclopentylamine,
N,N-di-(octoxyethyl)-cyclopentylamine,
N,N-di-(nonoxyethyl)-cyclopentylamine,
N,N-di-(decoxyethyl)-cyclopentylamine,
N,N-di-(undecoxyethyl)-cyclopentylamine,
N,N-di-(dodecoxyethyl)-cyclopentylamine,
N,N-di-(methoxyethyl)-cyclohexylamine, N,N-di-(ethoxyethyl)-cyclohexylamine,
N,N-di-(propoxyethyl)-cyclohexylamine,
N,N-di-(butoxyethyl)-cyclohexylamine,
N,N-di-(pentoxyethyl)-cyclohexylamine,
N,N-di-(hexoxyethyl)-cyclohexylamine,
N,N-di-(heptoxyethyl)-cyclohexylamine,
N,N-di-(octoxyethyl)-cyclohexylamine,
N,N-di-(nonoxyethyl)-cyclohexylamine,
N,N-di-(decoxyethyl)-cyclohexylamine,
N,N-di-(undecoxyethyl)-cyclohexylamine,
N,N-di-(dodecoxyethyl)-cyclohexylamine,
N,N-di-(methoxyethyl)-cycloheptylamine,
N,N-di-(ethoxyethyl)-cycloheptylamine,
N,N-di-(propoxyethyl)-cycloheptylamine,
N,N-di-(butoxyethyl)-cycloheptylamine,
N,N-di-(pentoxyethyl)-cycloheptylamine,
N,N-di-(hexoxyethyl)-cycloheptylamine,
N,N-di-(heptoxyethyl)-cycloheptylamine,
N,N-di-(octoxyethyl)-cycloheptylamine,
N,N-di-(nonoxyethyl)-cycloheptylamine,
N,N-di-(decoxyethyl)-cycloheptylamine,
N,N-di-(undecoxyethyl)-cycloheptylamine,
N,N-di-(dodecoxyethyl)-cycloheptylamine,
N,N-di-(methoxyethyl)-cyclooctylamine,
N,N-di-(ethoxyethyl)-cyclooctylamine,
N,N-di-(propoxyethyl)-cyclooctylamine,
N,N-di-(butoxyethyl)-cyclooctylamine,
N,N-di-(pentoxyethyl)-cyclooctylamine,
N,N-di-(hexoxyethyl)-cyclooctylamine,
N,N-di-(heptoxyethyl)-cyclooctylamine,
N,N-di-(octoxyethyl)-cyclooctylamine,
N,N-di-(nonoxyethyl)-cyclooctylamine,
N,N-di-(decoxyethyl)-cyclooctylamine,
N,N-di-(undecoxyethyl)-cyclooctylamine,
N,N-di-(dodecoxyethyl)-cyclooctylamine, etc.

The cycloalkyl may be substituted by alkyl groups, especially methyl. A typical substitution is 3,5,5-trimethylcyclohexyl moiety. The above compounds include those in which R' in the above formula are the same. Also included are compounds in which the R' groups are different but are selected from those hereinbefore set forth.

The specific compounds set forth above comprise those in which R is ethylene. It is understood that corresponding compounds in which each R is propylene, butylene, pentylene, hexylene, heptylene, octylene, nonylene or decylene are also included in the present invention. In still another embodiment, each R group may be different but selected from those hereinbefore set forth.

It is understood that when R and/or R' contain 3 or more carbon atoms, the configuration may be straight or branch chain. Illustrative compounds in which R is branched chain include N,N-di-(2-methoxypropyl)-isopropylamine, N,N-di-(2 - propoxy-2-methylpropyl)-cyclohexylamine, etc. Illustrative compounds in which R' is branched chain include N,N - di - (isopropoxyethyl)-sec-butylamine, N,N-di-(tert-butoxybutyl) - cyclohexylamine, etc.

The novel compounds of the present invention may be prepared in any suitable manner. In a preferred method, a di-(alkoxyalkyl)-amine is subjected to reductive alkylation with a ketone. The di-(alkoxyalkyl)-amine may be available commercially or may be prepared in any suitable manner. For example, di-(ethoxyethyl)-amine may be prepared by reacting ethoxyethyl chloride or bromide with ammonia. It is understood that other suitable methods of preparation may be used.

The di-(alkoxyalkyl)-amine or other di-(hydrocarbyloxyalkyl)-amine is subjected to reductive alkylation with a ketone in the presence of hydrogen and a reductive alkylation catalyst. The ketone will be selected to produce the desired substitution on the nitrogen atom. Illustrative but not limiting ketones include acetone, methylethyl ketone, methylpropyl ketone, methylbutyl ketone and corresponding methylalkyl ketones in which the alkyl group contains from 5 to about 18 carbon atoms, diethyl ketone, ethylpropyl ketone, ethylbutyl ketone, ethylpentyl ketone and corresponding ethylalkyl ketones in which the alkyl group contains from 6 to about 17 carbon atoms, dipropyl ketones, propylbutyl ketones, propylpentyl ketone, propylhexyl ketone and corresponding propylalkyl ketones in which the alkyl group contains from 7 to 16 carbon atoms. Other high molecular weight ketones may be used. When the substituent is a cycloalkyl group, cycloalkyl ketones are used and include cyclopropanone, cyclobutanone, cyclopentanone, cyclohexanone, cycloheptanone, cyclooctanone, phorone, isophorone, etc.

The reductive alkylation is effected in any suitable manner and either in a single or multiple step operation. In a particularly preferred method, the reductive alkylation is effected in a single step employing a hydrogen pressure of from about 100 to 3000 p.s.i.g. or more. Any suitable catalyst is employed including those containing nickel, cobalt, platinum, palladium, molybdenum, etc. or a mixture of these or of the oxides of chromium, copper and barium, preferably composited with a suitable support. A particularly preferred catalyst comprises a composite of platinum and alumina containing from about 0.1 to about 2% by weight of platinum, which may or may not contain chlorine and/or fluorine in a total halogen content of from about 0.01% to about 5% by weight. When using the platinum-containing catalyst, the temperature generally will be in the range of from about 90° to about 260° C. In a preferred continuous operation the catalyst is deposited as a fixed bed in a reaction zone and the reactants, at the desired temperature and pressure, are passed therethrough, in either upward or downward flow. Generally, an excess of ketone to di-(alkoxyalkyl)-amine is used and this excess may range from 1.5 to 20 moles of ketone per mole of di-(alkoxyalkyl)-amine.

The preparation of the novel compounds of the present invention may be effected in the presence of a suitable solvent in any stage of preparation. Particularly preferred solvents comprise hydrocarbons and more particularly aromatic hydrocarbon including benzene, toluene, xylene, ethylbenzene, cumene, etc. or mixtures thereof, paraffin hydrocarbon including particularly pentane, hexane, heptane, octane, etc. or mixtures thereof, or mixtures of paraffin and aromatic hydrocarbons, as well as mixtures such as gasoline, naphtha, etc. In some cases the solvent may comprise an alcohol including methanol, ethanol, propanol, butanol, etc.

In one embodiment, the novel compound of the present invention may be recovered in admixture with the solvent and used in this manner. In another embodiment the solvent may be removed in any suitable manner and particularly by vacuum distillation.

As hereinbefore set forth, in one embodiment these compounds are used as curing catalysts for curable polymeric compositions. The polymeric compositions also are referred to as plastics, resins or foams. In a particularly preferred embodiment, the curable polymeric compositions are urethanes and polyurethane foams. The polyurethanes generally are prepared by the reaction of an isocyanates with a polyol and/or polyester, as, for example, by the reaction of toluene-2,4-diisocyanate with polytetramethyleneether glycol, alone or in combination with other additional diols and/or other diisocyanates. A preferred diisocyanate is toluene-2,4-diisocyanate or the commercially available mixture of from about 60 to about 90% by weight of toluene-2,4-diisocyanate and from about 10 to about 40% by weight of toluene-2,6-diisocyanate. Other diisocyanates include 4 - methoxy - 1,3 - phenylene diisocyanate, 4-isopropyl-1,3-phenylene diisocyanate, 4-ethoxy, 4 - ethoxy - 1,3 - phenylene diisocyanate, 2,4'-diisocyanatodiphenylether, diphenylmethane diisocyanate, 3,3'-dimethyl - 4,4' - diisocyanatodiphenylmethane, 3,3'-dichloro-4,4'-diisocyanatodiphenylmethane, 3,3'-dialkoxy - 4,4' - diisocyanatodiphenylmethane, 1,5-naphthylenediisocyanate, mesitylenediisocyanate, durylenediisocyanate, xylylenediisocyanate, hexamethylenediisocyanate, etc. Triisocyanates include toluene-2,4,6-triisocyanate, 2,4,4'-triisocyanatodiphenylether, 2,4,4'-triisocyanatodiphenylmethane, triphenylmethane triisocyanate, etc. Other isocyanates include various polyfunctional and blocked polymeric isocyanates such as phenol blocked TDI trimer, polymethylene polyphenyl isocyanate of the following general composition:

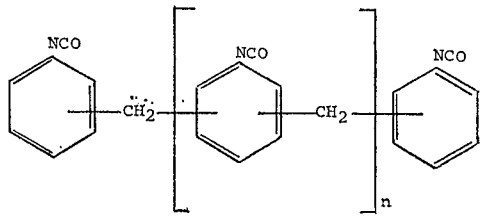

etc. It is understood that a mixture of the polyisocyanates may be employed.

Any suitable polyol or hydroxyl terminated polyester containing two hydroxyl groups is reacted with the polyisocyanate. Illustrative polyols include polypropyleneether glycol, 1,2-polydimethylethyleneether glycol, ethylene oxide modified polypropyleneether glycol, polytrimethylene-ether glycol, polytetramethyleneether glycol, polypentamethyleneether glycol, polydecamethyleneether glycol, polytetramethyleneformal glycol, etc. Polypropyleneether glycol and polytetramethyleneether glycol are preferred. Particularly preferred is polytetramethyleneether glycol having a molecular weight of from about 400 to about 2000. In another embodiment, polyalkylenearyleneether glycols are used. These correspond to the polyalkyleneether glycols, except that some of the alkylene radicals have been replaced by arylene radicals, preferably phenylene and naphthylene radicals. In addition, ethylene glycol, diethylene glycol, triethyleneglycol, tetraethylene glycol, propylene glycol, trimethylol alkanes, 1,2,6-hexanetrio pentaerylthritol, dipropylene glycol, polycaprolactone diols, glycol etheramines such as monoethanolamine, diethanolamine, triethanolamine, diglycolamine, polyalkyleneetherdiamines, N,N,N',N'-tetrakis (2-hydroxypropyl) ethylene diamine, N,N,N$^1$,N$^2$,N$^2$-pentakis (2-hydroxyethyl)-diethylenetriamine, 1,4-bis-(2-hydroxypropyl)-2-methylpiperazine, etc. Also included are polyoxyalkylene derivatives of alkylene glycols, glycerol, trimethylolalkanes, pentaerythritol, alkylenediamines, sorbitol, 2-methylglucoside, sucrose; various phosphorus containing polyols, phosphorus and halogen containing polyols, vinyl-resin-reinforced polyether-polyols, etc.

Polyesters containing two hydroxyl groups are prepared from dibasic acids including, for example, adipic acid, phthalic acid, sebacic acid, etc. Other dibasic acids include oxalic acid, malonic acid, succinic acid, suberic acid, azelaic acid, maleic acid, dimer acid, etc., as well as anhydrides thereof including succinic anhydride, phthalic anhydride, etc. These esters are prepared by the reaction of the dibasic acid with a diol including, for example, ethylene glycol, propylene glycol, 1,3-propanediol, thiodiglycol, diethylene glycol, 1,2-alkylene oxide-modified glycol, etc.

The polyurethane, resin, plastic, foam, either flexible, semi-flexible or rigid, is prepared in a conventional manner except for the use of the novel curing catalyst of the present invention in place of and/or in addition to conventional catalysts. Conventional preparations depending upon the specific product desired, include additional materials such as flame retardant additive, filler, extender, bacteriostat, pigment and the like, as well as curing (cross linking) agents. When foam is desired, the polymeric composition includes water or other foaming or blowing agents. These are well known in the art and need not be repeated herein. It is sufficient to state that the preparation of the desired polyurethane product is prepared in conventional manner except that the novel curing catalyst of the present invention is used in place of or in addition to the catalyst heretofore used in the prior art. The catalyst of this application may be used in moisture-cured urethane coatings, elastomers, urethane alkyds, flexible urethane foams based on polyesters, semi-rigid urethane foams, etc.

In another embodiment the compound of the present invention is used as a curing catalyst for epoxy resins. The epoxy resins are formed by the reaction of a 1,2-epoxy-compound and a dihydric phenol or polyalcohol as, for example, the reaction of an epichlorohydrin with bisphenol-A (2,2-bis-(4-hydroxyphenyl)-propane). By varying the ratio of epichlorohydrin and bis-phenol-A, resins may be produced which range from low viscosity material to high melting solids. Included in the epoxidized resins are the epoxy cresol novalac resins and the epoxy phenol novalac resins. Another epoxy resin is prepared from epoxy compounds in which the epichlroohydrin groups are attached directly to the cycloaliphatic portion of the molecule rather than on the alkyl chains. Here again, cross linking agents, as well as other conventional ingredients, are included in the composition. As before, these ingredients and methods of preparation are well known in the art and need not be repeated here, with the understanding that these preparations will utilize the novel curing catalyst of the present invention in place of and/or in addition to conventional curing catalysts.

Another resin which is subjected to curing is polycarbonates. The polycarbonates comprise polyesters of carbonic acid, which are derived from dihydroxyl compounds in which the hydroxyl groups are directly attached to aromatic rings as, for example, the polyester prepared by reacting carbonic acid and bisphenol-A. Here again conventional ingredients and methods of processing are utilized except for the novel curing catalyst of the present invention which is used in place of and/or in addition to the prior art curing catalyst.

The previous discussion refers to conventional curing catalysts. These include short chain amides, such as dicyandiamide, tertiary amines such as benzyldimethylamine, non-functional secondary amines such as piperidine, etc. Conventional cross linking agents include diethylene triamine, triethylene tetramine, aminoethyl piperazine, amine aducts, secondary aliphatic polyamines such as piperazine, polyamides, primary aromatic polyamines, etc. Also used as cross linking agents are various acid anhydrides, including hexahydrophthalic anhydride, tetrahydrophthalic anhydride, methyl endomethylene, maleic anhydride, dodecenyl succinic anhydride, chlorendic anhydride, etc. A recently proposed anhydride for acting both as cross linking agent and as a flame retardant is 5,6,7,8,9,9 - hexachloro-1,2,3,4,4a,5,8,8a-octahydro-5,8-methano-2,3-naphthalene dicarboxylic anhydride, as well as derivatives thereof. As hereinbefore set forth, the novel curing catalyst of the present invention may be used in admixture with one or more of the above compounds.

The concentration of the curing catalyst of the present invention will vary with the different polymeric compositions being cured. The concentration may be within the range of from about 0.1% to about 10% and more particularly from about 0.2% to about 1% by weight of the polymeric composition.

As hereinbefore set forth, in still another embodiment the compound of the present invention is used as an additive in polymeric composition to retard deterioration due to oxygen, ultraviolet light absorption and/or heating. In this embodiment, the polymeric composition does not undergo curing and would include such polymeric compositions as polyolefins and particularly polyethylene, polypropylene, polybutylene and mixed polymers of ethylene, propylene and/or butylene. Other plastics which are similarly stabilized include acrylonitrile-butadiene-styrene polymers (A.B.S.), polystyrene, polyphenyl oxides, phenol-formaldehyde resins, urea-formaldehyde resins, melamine, formaldehyde resins, acryloid plastics, polyester resins, etc.

When used as a stabilizer in polymeric compositions, the additive will be used in a sufficient concentration to accomplish the desired stabilization. This concentration may range from about 0.01% to about 5% and preferably from about 0.1% to about 1.0% by weight of the polymeric composition.

While the embodiments hereinbefore set forth are directed to the use of the additive of the present invention in polymeric compositions, in still another embodiment the compound of the present invention is used as an additive in other organic substances and particularly as an additive to fuel oil to prevent sediment formation therein. These compounds also may be used for a similar purpose in other hydrocarbon distillates including gasoline, naphtha, kerosene, diesel fuel, marine fuel, burner oil, range oil, lubricating oil, etc. For such use, the additive is employed in as low a concentration as practical for economical reasons. In some cases this may range as low as 0.001% by weight and may go as high as 0.5% or even up to 1% by weight of the hydrocarbon distillate.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particular 2,6-di-tert-butyl - 4 - methylphenol. Other inhibitors which may be used generally will be of the phenolic or amine type and include phenyl - alpha-naphthylamine, phenyl - beta - naphthylamine, phenothiazine, Nonox WSP, Nonox Cl, dialkylated phenols, trialkylated phenols including 2,4-dimethyl-6-tert-butylphenol, etc., Santonox R, Santowhite, alkyl-alkoxyphenols, 2246 (2,2' - methylene-bis-(4-methyl-6-tert-butylphenol) and 425 (2,2'-methylene-bis-4-ethyl - 6 - tert-butylphenol), diphenyl-p-phenylenediamine, 1,1,3-tris - (2 - methyl - 4-hydroxy-5-tert-butylphenyl) butane, 703 (2,6-di-tert-butyl-alpha-dimethylamino-p-cresol), 4,4' - bis-(2-methyl-6-tert-butylphenol, 4,4'-thiobis-(6-tert-butyl-o-cresol), 4,4' - bis 2,6-di-tert-butylphenol), 4,4' - methylene-bis-(2,6-di-tert-butylphenol), Salol (salicyclic acid esters), p-octyl-phenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone and especially such hydroxybenzophenone as 2,2'-dihydroxy - 4 - octoxybenzophenone, 2,2'-dihydroxy - 4 - decoxybenzophenone, 2,2' - dihydroxy - 4 - dodecoxybenzophenone, 2,2'-dihydroxy-4-octadecoxybenzophenone, etc., in general any alkoxy or cycloalkoxy substituted 2,2'-dihydroxybenzophenone, 2-hydroxy-4'-octoxybenzophenone, 2-hydroxy-4'-decoxybenzophenone, 2-hydroxy-4'-dodecoxy, etc., and in general any alkoxy or cycloalkoxy substituted 2-hydroxybenzophenone. Other ultraviolet light stabilizers include nickel-bis-dithiocarbamates, nickel-bis-dihydroxypolyalkylphenol sulfides, especially [2,2'-thiobis-(4-tert-octylphenolato)]-n-butylamine nickel (II), dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, various N-hydroxyphenylbenzotriazoles such as 2-(2'-hydroxy-5'-octylphenyl)-benzotriazole, 2-(2' - hydroxy - 5'-dodecylphenyl)-benzotriazole, 2-(2'-hydroxy - 5' - octoxyphenyl)-benzotriazole, 2-(2'-hydroxy-5'-dodecoxyphenyl)-benzotriazole, Tinuvin 326, etc. in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

When used in fuel oil, the compound of the present invention may be used along with an additional antioxidant, which generally will be a phenol, including 2,6-di-tertiarybutyl - 4 - methylphenol, 2,4 - dimethyl - 6 - tertiarybutylphenol, etc. or an amine, including N,N'-diisopropyl-p-phenylenediamine, N,N'-di-sec-butyl-p-phenylenediamine, N,N'-di-sec-octyl-p-phenylenediamine, etc., and/or a metal deactivator, including disalicylal diaminopropane, ethylenediaminetetra acetic acid or its alkali metal salt, etc. When used in gasoline, other additives comprise antiknock agent, dye, etc. In addition, the composition may contain other detergent and/or dispersing agents. When desired, the novel compound of the present invention may be prepared as a mixture with one or more of these other additives and used in this manner.

The following examples are introduced to illustrate further the novelty and utility of the present invention but not with the intention of unduly limiting the same.

EXAMPLE I

The compound of this example is N,N-di-(ethoxyethyl)-isopropylamine and was prepared by the reductive alkylation of di-(ethoxyethyl)-amine with acetone. Specifically, 1 pound of di-(ethoxyethyl)-amine and 600 g. of acetone were subjected to reductive alkylation at 160° C. and a hydrogen pressure of about 100 atmospheres in the presence of 100 g. of a platinum-alumina catalyst containing about 0.3% by weight of platinum. The reaction was effected in a rocking bomb for about 4 hours. After completion of the reaction, the contents were filtered to remove catalyst. Excess ketone was removed by vacuum distillation. The product, N,N-di-(ethoxyethyl) - isopropylamine was recovered as a light colored liquid, boiling at 62° C. at 0.3 mm. Hg (uncorrected) and having a basic nitrogen content of 4.89 meq./g. which is equivalent to a mole equivalent weight of 204.7. This corresponds to the theoretical mole equivalent weight of 203.

EXAMPLE II

The compound of this example is N,N-di-(ethoxyethyl)-cyclohexylamine and was prepared by subjecting 200 g. of di-(ethoxyethyl)-amine to reductive alkylation with 300 g. of cyclohexanone in the presence of a platinum-alumina catalyst, the catalyst being substantially the same as described in Example I. The reductive alkylation was effected at 160° C. under a hydrogen pressure of about 100 atmospheres. Following completion of reaction, the reaction mixture was filtered to remove the catalyst, and the filtrate was subjected to vacuum distillation to remove any unreacted cyclohexanone, N,N-di-(ethoxyethyl)-cyclohexylamine was recovered as a clear liquid, boiling at 121° C. at 0.5 mm. Hg (uncorrected), and having a basic nitrogen of 4.06 meq./g. which is equivalent to a mole equivalent weight of 247. This corresponds to the theoretical mole equivalent weight of 243.

EXAMPLE III

The compound of this example is N,N-di-(isopropoxypropyl)-sec-octylamine and is prepared by the reductive alkylation of di-(isopropoxypropyl)-amine with methylhexyl ketone. The reductive alkylation is effected at a temperature of about 160° C. under a hydrogen pressure of 125 atmospheres in the presence of a platinum-alumina catalyst. The reaction is effected in a rotating autoclave for a time of about 4 hours. After completion of the reaction, the contents of the autoclave are filtered to remove the catalyst and the filtrate then is subjected to vacuum distillation to remove any unreacted products and to recover the N,N-di-(isopropoxypropyl)-sec-octylamine as the desired product.

EXAMPLE IV

The compound of this example is N,N-di-(cyclohexoxyhexyl)-cyclohexylamine and is prepared by the reductive alkylation of di-(cyclohexoxyhexyl)-amine with cyclohexanone. The reductive alkylation is effected at a temperature of about 160° C. and a hydrogen pressure of 110 atmospheres in the presence of a platinum-alumina catalyst. The reaction is effected in a rotating bomb for about 5 hours.

Following completion of reaction, the effluent products are filtered to remove the catalyst and any unreacted constituents are removed by vacuum distillation. The product is N,N-di-(cyclohexoxyhexyl)-cyclohexylamine.

EXAMPLE V

This example and a number of the following examples describe the preparation of polyurethane foam. The basic formulation is the same except for the particular curing catalyst. The ingredients and concentrations thereof are as follows.

Ingredient:  Parts by weight (grams)
- Polyol-Witco G–3530 (reaction product of propylene oxide and glycerin) _____ 404.0
- Polymeric silicon surfactant L–540 _____ 4.0
- Deionized water _____ 14.1
- N-lauryl morpholine _____ 1.2
- Stabilized stannous octoate T-9 (stabilizer is 2,6-di-tertiarybutyl-4-methylphenol) _____ 0.6
- Toluene diisocyanate (commercial 80/20 mixture of 2,4- and 2,6-isomers) _____ 175.0
- Curing catalyst _____ 1.0

The foam was prepared by first mechanicaly stirring a mixture of the polyol and silicone, then adding the water, curing catalyst to be hereinafter described and n-lauryl morpholine and then further mechanically stirring the mixture. The stannous octoate and toluene diisocyanate were added and the mixture was stirred for 5–7 seconds and then poured into a mold which was preheated to a temperature of about 105° F. and was pretreated with a mold releasing agent. The foam then is cured in an air circulating oven at 300° F. for 25 minutes. The results are reported as the ILD values and also by the SAC factor (ratio of the loads necessary to produce 65% and 25% indentations in the foamed product). This is ASTM method D1564–64T (loaded deflection test).

The curing catalyst of this example was N,N-di-(ethoxyethyl)-cyclohexylamine as prepared according to Example II. In these evaluations, the foam had an original thickness of about 4 inches. As set forth above, the curing catalyst was used in a concentration of 1.0 g. The results of the evaluation are reported in the following table in which the up and down refer to the hysteresis curve.

| Up, lbs. | Inches | Down, lbs. |
|---|---|---|
| 33.5 | 0.5 | 20.0 |
| 44.0 | 1.0 | 28.5 |
| 56.5 | 1.5 | 38.5 |
| 72.5 | 2.0 | 52.0 |
| 104.0 | 2.5 | 78.5 |
| 219.0 | 3.0 | 192.0 |
| 255.0 | 3.059 | |

The SAC factor is 2.38.

EXAMPLE VI

This example reports the results obtained when using a conventional catalyst of the prior art. The catalyst used in this example was "DABCO" (triethylenediamine) and also was used in a concentration of 1.0 g. The results of an evaluation made in the same manner as described in Example V are as follows:

| Down, lbs. | Inches | Up, lbs. |
|---|---|---|
| 33.5 | 0.5 | 21.5 |
| 44.0 | 1.0 | 28.5 |
| 56.0 | 1.5 | 38.0 |
| 70.5 | 2.0 | 50.5 |
| 96.0 | 2.5 | 74.0 |
| 175.5 | 3.0 | 153.0 |
| 219.0 | 3.102 | |

The SAC factor is 2.22.

In comparing the results obtained with the commercial curing catalyst, it will be noted that the curing catalyst of the present invention gave a higher SAC factor and a higher ILD value.

EXAMPLE VII

As hereinbefore set forth the curing catalyst of the present invention may be used in admixture with conventional catalysts of the prior art. This example results when using a formulation similar to that set forth in Example V except that the curing catalyst comprised a mixture of 0.5 g. of N,N-di-(ethoxyethyl)-cyclohexylamine, prepared as described in Example II, and 0.5 g. of "DABCO" (triethylenediamine).

The results of the evaluation are reported in the following table:

| Up, lbs. | Inches | Down lbs. |
|---|---|---|
| 34.0 | 0.5 | 21.5 |
| 44.5 | 1.0 | 28.0 |
| 56.0 | 1.5 | 38.0 |
| 71.0 | 2.0 | 50.0 |
| 97.0 | 2.5 | 73.5 |
| 187.5 | 3.0 | 160.5 |
| 242.0 | 3.103 | |

EXAMPLE VIII

This example illustrates commercial automotive topper pad formulation of the following recipe:

Ingredient:  Parts by weight (grams)
- Actol 33–46 triol _____ 300.0
- Polymeric silicone surfactant _____ 6.0
- Deionized water _____ 10.5
- N-ethyl-morpholine _____ 1.35
- Stabilized stannous octoate T–9 _____ 0.45
- Freon 11 _____ 45.0
- Toluene diisocyanate _____ 130.5
- Triethylamine _____ 0.5
- DABCO _____ 0.3

When evaluated in the same manner as described in Example V, the results obtained are as follows.

| Up, lbs. | Inches | Down, lbs. |
|---|---|---|
| 16.5 | 0.5 | 10.5 |
| 22.0 | 1.0 | 14.0 |
| 28.0 | 1.5 | 19.0 |
| 35.0 | 2.0 | 25.0 |
| 47.5 | 2.5 | 36.0 |
| 90.0 | 3.0 | 76.0 |
| 118.0 | 3.110 | |

EXAMPLE IX

Another preparation was made in the same manner as described in Example VIII except that the DABCO catalyst was replaced by 0.3 g. of N,N-di-(ethoxyethyl)-cyclohexylamine prepared as described in Example II.

The results of this evaluation are as follows:

| Up, lbs. | Inches | Down, lbs. |
|---|---|---|
| 14.5 | 0.5 | 10.0 |
| 19.5 | 1.0 | 13.0 |
| 24.5 | 1.5 | 18.0 |
| 31.0 | 2.0 | 23.5 |
| 44.0 | 2.5 | 34.0 |
| 91.0 | 3.0 | 79.5 |
| 106.0 | 3.063 | |

When comparing the results of Examples VIII and IX, it will be seen that the compound of the present invention may be substituted satisfactorily for the commercial catalyst.

EXAMPLE X

One-shot polyether foam is prepared by mixing 50 parts of 3000 molecular weight triol (Wyandotte) with 50 parts of 4000 molecular weight triol. 1.5 parts of L–520 silicon stabilizer (poly - siloxane - poly - oxyalkylene block copolymer described in U.S. Pat. 2,834,748) is added together with 0.35 part of stannous octoate. 0.20 part of N,N-di(propoxypropyl)sec-butylamine are used as catalyst, together with 4 parts water and 50 parts of toluenediisocyanate (TDI). The foam is cured at 125° C. for 1.5 hours.

EXAMPLE XI

N,N-di-(ethoxyethyl)isopropylamine, prepared as described in Example I, is used as a curing catalyst for an epoxy resin. The epoxy resin is marketed under the trade name of "Epon 828" and is a liquid at room temperature, having a viscosity at 77° F. of 100–160 poises, a maximum Gardner color of 8, and an epoxide equivalent (gram of resin containing one gram equivalent of epoxide) of 175–210 and a weight of 9.7 gallons per pound at 68° F.

The epoxy resin described above is cured by adding, with stirring, the N,N-di-(ethoxyethyl)isopropylamine, together with tetrahydrophthalic anhydride. In order to avoid air bubbles in the system, the mixture of resin and curing catalyst is heated prior to pouring into the mold. The mold is first coated with a conventional release agent to avoid sticking thereto. The mold containing the resin and curing catalyst is cured in a conventional oven at 212° F. for 6 hours.

EXAMPLE XII

A room temperature cured adhesive is prepared by mixing 75% of Epon resin of molecular weight of 450 with 25 parts of polyglycidyl ether of glycerol and 10 parts of allylglycidyl ether. In addition, 100 parts of alumina powder are mixed in the formulation. The formulation is cured with 10 parts of the amine of Example I.

EXAMPLE XIII

N,N-di-(ethoxyethyl)-cyclohexylamine, prepared as described in Example II, is used as a weathering agent for plastic. The plastic is solid polyethylene of the high density type and is marketed commercially under the trade name of "Fortiflex." The polyethylene is milled in a two roll heated mill of conventional commercial design and 0.2% per weight of N,N-di-(ethoxyethyl)-cyclohexylamine is incorporated in the polyethylene during the milling. The polyethylene then is further processed in conventional manner and will be of improved weathering properties.

EXAMPLE XIV

This example describes the use of N,N-di-(ethoxyethyl)-cyclohexylamine, prepared as described in Example II, as an additive to prevent sediment formation in fuel oil. The fuel oil used in this example is a light, catalytically cracked cycle oil. Sample of the oil are maintained for 16 hours at 100° C. in an oxygen atmosphere, after which the amount of sediment is determined. In general, if the amount of sediment formed in this manner is less than 1.6 mg./100 ml., the oil is considered stable. Also it appears that this method correlates very well with 3 month storage test at 43° C.

A control sample of this oil, not containing an additive, will form about 15.4 mg./100 ml. of sediment when evaluated in the above manner. In contrast, another sample of this oil containing 50 parts per million of N,N-di-(ethoxyethyl)-cyclohexylamine forms less than 1.0 mg./100 ml. of sediment when evaluated in the above manner.

The additive described above also is used in admixture with conventional copper deactivator (disalicylaldiaminopropane) to even further reduce the sediment formation.

I claim as my invention:

1. Polyolefin selected from the group consisting of polypropylene, polyethylene and polybutylene stabilized against deterioration due to oxygen, ultraviolet light absorption and/or heating by the presence therein of from about 0.01% to about 5% of an N,N'-di-(hydrocarbyloxyalkyl)-hydrocarbylamine of the formula:

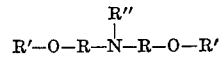

where R is alkylene of from 2 to about 10 carbon atoms, R' is selected from alkyl of from 1 to about 20 carbon atoms and cycloalkyl of from 3 to about 12 carbon atoms and R″ is selected from sec-alkyl of from 3 to about 20 carbon atoms and cycloalkyl of from 3 to about 12 carbon atoms.

2. The composition of claim 1 in which said amine is N,N-di-(hydrocarbyloxyalkyl)-sec-alkylamine.

3. The composition of claim 2 in which said amine is N,N-di-(ethoxyethyl)-isopropylamine.

4. The composition of claim 2 in which said amine is N,N-di-(ethoxyethyl)-sec-butylamine.

5. The composition of claim 2 in which said amine is N,N-di-(ethoxyethyl)sec-octylamine.

6. The composition of claim 1 in which said amine is N,N-di-(hydroxycarbyloxyalkyl)-cycloalkylamine.

7. The composition of claim 6 in which said amine is N,N-di-(ethoxyethyl)cyclohexylamine.

8. The composition of claim 1 in which the polyolefin is polyethylene.

References Cited

UNITED STATES PATENTS

| | | | |
|---|---|---|---|
| 2,941,967 | 6/1960 | Möller et al. | 260—2.5 |
| 3,036,975 | 5/1962 | Taub | 260—584 |
| 3,167,518 | 1/1965 | Farkas et al. | 260—2 |
| 3,214,397 | 10/1965 | Cox | 260—2.5 |
| 3,223,734 | 12/1965 | Fallstad et al. | 260—583 |
| 3,251,807 | 5/1966 | Deanin et al. | 260—47 |
| 3,451,459 | 6/1969 | Bevilacqua | 260—45.9 |

M. J. WELSH, Primary Examiner

V. P. HOKE, Assistant Examiner

U.S. Cl. X.R.

260—2.5 AC, 2.5 Ep CN, 2 Ep, 47 X, 75 TN, 75 TNC, 75 R, 77.5 AC, 798